United States Patent
Varrasso et al.

(12) 
(10) Patent No.: US 6,177,656 B1
(45) Date of Patent: Jan. 23, 2001

(54) METHOD AND APPARATUS FOR CONTROLLING HEATING AND COOLING IN SEGMENTS OF A FIBER GLASS BUSHING

(75) Inventors: Eugene C. Varrasso, Heath; Paul S. Sanik, Galena, both of OH (US)

(73) Assignee: Advanced Glassfiber Yarns, LLC, Aiken, SC (US)

(*) Notice: Under 35 U.S.C. 154(b), the term of this patent shall be extended for 0 days.

(21) Appl. No.: 09/464,817

(22) Filed: Dec. 17, 1999

Related U.S. Application Data

(62) Division of application No. 09/009,478, filed on Jan. 20, 1998, now abandoned, which is a division of application No. 08/734,421, filed on Oct. 16, 1996, now Pat. No. 5,785,728, which is a continuation of application No. 08/322,657, filed on Oct. 12, 1994, now abandoned.

(51) Int. Cl.[7] ........................................... H05B 1/02
(52) U.S. Cl. ..................... 219/492; 219/483; 219/508; 219/501; 219/497; 65/384; 65/488; 65/162
(58) Field of Search ........................... 219/492, 494, 219/497, 501, 505, 507–509; 307/117; 65/384, 488, 162

(56) References Cited

U.S. PATENT DOCUMENTS

| | | |
|---|---|---|
| 4,043,778 | 8/1977 | Harris . |
| 4,272,271 | 6/1981 | Thompson . |
| 4,285,711 | 8/1981 | Willis . |
| 4,285,713 | 8/1981 | Thompson . |
| 4,511,791 | 4/1985 | Desai et al. . |
| 4,515,614 | 5/1985 | Barkhau et al. . |
| 4,544,392 | 10/1985 | Sheinkop . |
| 4,594,087 | 6/1986 | Kuhn . |
| 4,657,572 | 4/1987 | Desai et al. . |
| 4,704,150 | 11/1987 | McEarthron . |
| 4,738,700 | 4/1988 | Grundy . |
| 4,746,344 | 5/1988 | Kuhn et al. . |
| 4,775,400 | 10/1988 | Wright et al. . |
| 4,780,120 | 10/1988 | Varrasso . |
| 4,787,926 | 11/1988 | Varrasso . |
| 4,931,075 | 6/1990 | Kuhn . |
| 5,051,121 | 9/1991 | Grundy . |

*Primary Examiner*—Mark Paschall
(74) *Attorney, Agent, or Firm*—Alston & Bird, LLP

(57) ABSTRACT

A supplemental controller for a fiber glass bushing actively performs heating and cooling of a connected segment of the bushing which is otherwise controlled by a primary controller. In one embodiment, the supplemental controller performs heating by means of current injection into a connected bushing segment and cooling by means of current diversion from or around the connected bushing segment. Initial start-up and balancing operations can be performed without activation of the supplemental controller. In another embodiment of the invention, the supplemental controller heats a bushing segment by injecting current in-phase with current from the primary bushing controller and cools the bushing segment by injecting current out-of-phase with current from the primary bushing controller.

4 Claims, 3 Drawing Sheets

METHOD AND APPARATUS FOR CONTROLLING HEATING AND COOLING IN SEGMENTS OF A FIBER GLASS BUSHING

RELATED APPLICATIONS

This application is a divisional of U.S. patent application Ser. No. 09/009,478 filed Jan. 20, 1998 and now abandoned, which application is a divisional of U.S. patent application Ser. No. 08/734,421, filed Oct. 16, 1996 which is now U.S. Pat. No. 5,785,728, issued Jul. 28, 1998, which is a continuation of U.S. patent application Ser. No. 08/322,657, filed Oct. 12, 1994, now abandoned.

BACKGROUND OF THE INVENTION

The present invention relates in general to the control of glass fiber forming bushings and, more particularly, to an improved method and apparatus for controlling one or more segments of a multiple segment bushing to extend the range of control utilizing a given auxiliary power level by controlling both the heating and cooling of one or more segments of the bushing.

Glass fibers are commonly produced by drawing multiple streams of molten glass through nozzles or holes located in a heated container known in the industry as a bushing. The bushing is electrically resistance heated by passing high currents through it. Since the temperature of the bushing is one important factor in determining the characteristics of the glass fibers which are produced using the bushing, a variety of temperature control arrangements have been devised. All known fiber glass bushing control circuits are based on either current diversion around all or one or more segments of a multiple segment bushing or current injection into one or more segments of a multiple segment bushing.

Temperature control using current diversion around a bushing or one or more segments of a multiple segment bushing is disclosed, for example, in U.S. Pat. No. 4,594,087. In the disclosed arrangement, a controller diverts current around a bushing or segments of a bushing using variable impedance circuits. The diverted current reduces the temperature of the bushing or segment of the bushing from which current was diverted. An improved bushing controller utilizing an auxiliary transformer in each of the variable impedance circuits of the '087 controller to increase the current capacity of the controller is disclosed in U.S. Pat. No. 4,931,075.

Temperature control using current injection into a bushing is disclosed, for example, in U.S. Pat. No. 4,780,120. In the disclosed arrangement, current is injected into all but one segment of a multiple segment bushing and adjusts the supply of electrical energy to the entire bushing to control the temperature of each segment of the bushing.

Many of the known prior art arrangements are able to control fiber glass bushings to produce high quality glass fibers. Unfortunately, all known prior art arrangements require partial activation, preferably approximately 50%, during initial start-up and balancing of a fiber glass bushing which complicates these procedures.

There is an ongoing need for improvement in controlling fiber glass bushings to improve their operation and efficiency. Preferably, an improved bushing controller would not interfere with initial start-up and balancing operations, would provide increased range of bushing control without increasing the size of an auxiliary bushing power supply and would improve the coefficient of variation of glass fibers produced by controlled fiber glass bushings.

SUMMARY OF THE INVENTION

This need is met by the invention of the present application wherein a supplemental controller for a fiber glass bushing actively performs heating and cooling of a connected segment of the bushing which is otherwise controlled by a primary controller. In one embodiment of the supplemental controller of the present application, heating is performed by means of current injection into a connected bushing segment and cooling is performed by means of current diversion from or around the connected bushing segment. In another embodiment of the invention, heating is performed by injecting current into a segment in which the injected current is in-phase with current from a primary bushing controller while cooling is performed by injecting current which is out-of-phase with current from the primary bushing controller. With this improved positive control of both heating and cooling, initial start-up and balancing operations can be performed without activation of the supplemental controller. Since auxiliary power for heating does not have to be applied at approximately 50% during start-up and balancing operations, the effective control range is expanded. The control range is in fact approximately doubled over prior art arrangements with the same size auxiliary power supply.

In accordance with one aspect of the present invention, a method for supplemental control of a segment of a fiber glass bushing controlled by a bushing primary controller comprises the steps of: coupling a heating and cooling circuit to the segment of the fiber glass bushing; generating a control signal for the segment of the fiber glass bushing; determining whether the control signal commands heating or cooling of the segment of the fiber glass bushing; and, operating the heating and cooling circuit to heat and cool the segment of the fiber glass bushing in accordance with the determined requirements of the control signal.

The step of determining whether the control signal commands heating or cooling of the segment of the fiber glass bushing may comprise the step of comparing the control signal to a threshold. The step of generating a control signal for the segment of the fiber glass bushing may comprise the steps of determining the temperature of the segment of the fiber glass bushing, and utilizing the determined temperature of the segment of the fiber glass bushing in a temperature controller to generate the control signal. In one embodiment of the invention, the step of operating the heating and cooling circuit to heat and cool the segment of the fiber glass bushing in accordance with the determined requirements of the control signal may comprise the steps of connecting in-phase current to the segment of the fiber glass bushing for heating the segment, and connecting out-of-phase current to the segment of the fiber glass bushing for cooling the segment.

The step of coupling a heating and cooling circuit to the segment of the fiber glass bushing may comprise the steps of coupling a current diversion circuit to the segment of the fiber glass bushing and coupling a current injection circuit to the segment of the fiber glass bushing. The step of operating the heating and cooling circuit to heat and cool the segment of the fiber glass bushing in accordance with the determined requirements of the control signal may comprise the steps of operating the current diversion circuit for cooling of the segment of the fiber glass bushing, and operating the current injection circuit for heating of the segment of the fiber glass bushing.

The heating and cooling circuit is controlled to conduct portions of cycles of ac electrical energy to the segment of the fiber glass bushing for heating and to conduct portions of cycles of ac electrical energy from the segment of a fiber glass bushing for cooling. And the step of operating the heating and cooling circuit to heat and cool the segment of the fiber glass bushing in accordance with the determined requirements of the control signal comprises the steps of determining current flow in the heating and cooling circuit, generating a current flow signal corresponding to the current flowing in the heating and cooling circuit, combining the current flow signal and the control signal to generate a control error signal, determining a conduction control signal for the heating and cooling circuit in response to the control error signal, and operating the heating and cooling circuit in response to the conduction control signal.

Where the heating and cooling circuit comprises a first current control switch for connecting supplemental current to the segment of the fiber glass bushing and a second current control switch for diverting current around the segment of the fiber glass bushing, the step of operating the heating and cooling circuit in response to the conduction control signal comprises the step of controlling an onset of current conduction through the first and second current control switches for controlling heating and cooling of the segment of the fiber glass bushing, respectively.

In accordance with another aspect of the present invention, a supplemental controller is provided for a segment of a fiber glass bushing controlled by a primary bushing controller. The supplemental controller is responsive to a control signal and comprises a heating and cooling circuit coupled to the segment of the fiber glass bushing, and a controller circuit for operating the heating and cooling circuit to heat and cool the segment of the fiber glass bushing in accordance with the control signal.

The heating and cooling circuit comprises a transformer having a primary winding connected to a power source and a secondary winding connected across the segment of a fiber glass bushing to be controlled. A first current switch is connected in series between the power source and the primary winding for controllably passing current to the transformer for heating the segment of a fiber glass bushing. A second current switch is connected in shunt across the primary winding of the transformer between the first current switch and the primary winding for controllably passing current therethrough for diverting current from the segment of a fiber glass bushing for cooling the segment. In an illustrative embodiment, each of the first and second current switches comprises a pair of silicon controlled rectifiers connected anti-parallel to one another.

The controller circuit comprises a heat-cool detector circuit responsive to the control signal for determining whether the control signal commands heating or cooling of the segment of a fiber glass bushing. The heat-cool detector also provides for generating heat-cool signals. A driver circuit is coupled between the heat-cool detector circuit and the heating and cooling circuit. The driver circuit is enabled by the heat-cool signals for operating the first current switch for heating the segment of a fiber glass bushing and for operating the second current switch for cooling the segment.

The supplemental controller may further comprise a current sensor for determining current flow in the primary winding of the transformer and generating a current flow signal representative of the current flow. When the current sensor is present, the controller circuit further comprises a conduction control circuit for combining the control signal with the current flow signal to generate a conduction control signal. A timer circuit is coupled to the driver circuit and the conduction control circuit for generating conduction control signals which determine conduction angles for the first and second current switches. Preferably, the conduction control circuit comprises a proportional plus integral controller.

In accordance with yet another aspect of the present invention, a supplemental controller for a segment of a fiber glass bushing controlled by a primary bushing controller comprises a transformer having a secondary winding connected to the segment and a primary winding connectable to an ac power source used by the primary bushing controller. A first current switch is connected in series with the primary winding for connecting the primary winding of the transformer to the ac power source. A second current switch is connected in shunt across the primary winding. Heat-cool control means is provided for receiving a control signal representative of a commanded temperature for the segment and generating heat enable signals and cool enable signals. Current monitoring means is provided for monitoring current flow in the primary winding of the transformer and generating a current flow signal.

Conduction setting means responsive to the control signal and the current flow signal is provided for generating a conduction setting signal. Timer means is provided for generating a conduction control signals in response to the conduction setting signal. Driver means is responsive to the conduction control signals and the heat enable signals for operating the first current switch to heat the segment, and is responsive to the conduction control signals and the cool enable signals for operating the second current switch to cool the segment.

The heat-cool control means may comprise scaling and shifting means for receiving an input control signal and scaling and shifting the input control signal to generate the control signal. For such operation, comparator means is provided for comparing the control signal to a threshold signal above which supplemental current is to be connected to the segment for heating the segment and below which current is to be diverted around the segment for cooling the segment. Logic circuit means is connected to the comparator means for generating the heat enable signals and the cool enable signals.

The conduction setting means may further comprise first rectifier means for rectifying the control signal to generate a rectified control signal and second rectifier means for rectifying the current flow signal to generate a rectified current flow signal. The conduction setting means combines the rectified control signal and the rectified current flow signal to generate the conduction setting signal. The conduction control means preferably comprises a proportional plus integral controller.

In accordance with still another aspect of the present invention, a system for controlling a fiber glass bushing having at least three segments including first and second end segments located at opposite ends of the bushing comprises a primary controller connected across all segments of the fiber glass bushing, a first end supplemental controller connected across the first end segment for heating and cooling the first end segment, and a second end supplemental controller connected across the second end segment for heating and cooling the second end segment.

The first end supplemental controller is responsive to a first control signal and comprises a heating and cooling circuit coupled to the first end segment of the fiber glass bushing. A controller circuit operates the heating and cooling circuit to heat and cool the first end segment of the fiber glass bushing in accordance with the first control signal. The second end supplemental controller is responsive to a second control signal and comprises a heating and cooling circuit coupled to the second end segment of the fiber glass bushing. A controller circuit operates the heating and cooling circuit to heat and cool the second end segment of the fiber glass bushing in accordance with the second control signal.

It is, thus, an object of the present invention to provide an improved supplemental controller for a fiber glass bushing which actively performs both heating and cooling of a segment of the bushing; to provide an improved supplemental controller for a segment of a fiber glass bushing which injects current to heat the segment and diverts current to cool the bushing; and, to provide an improved supplemental controller for a segment of a fiber glass bushing which connects current in-phase with current from a primary bushing controller to heat the bushing segment and connects current out-of-phase with current from the primary bushing controller to cool the bushing segment.

Other objects and advantages of the invention will be apparent from the following description, the accompanying drawings and the appended claims.

DETAILED DESCRIPTION OF THE INVENTION

Figure 1:
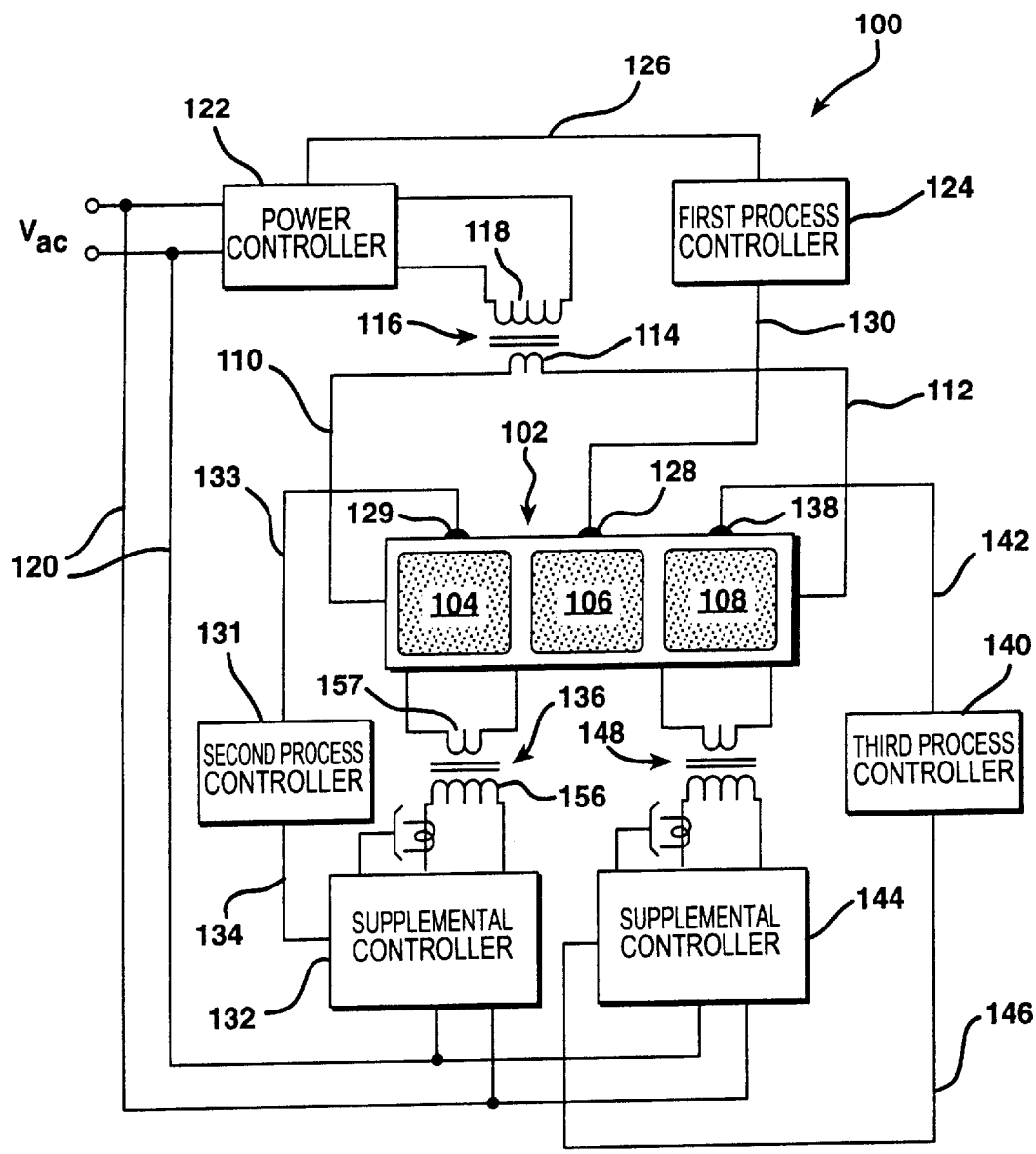
FIG. 1 is a schematic block diagram of a controller for a multiple segment bushing operable in accordance with the present invention.

Reference will now be made to the drawing figures wherein FIG. 1 schematically illustrates a system 100 for controlling and maintaining the temperature of a multiple segment mineral or glass bushing 102. The system 100 is illustrated as using thermocouples as temperature sensors. It is noted, however, that other temperature sensing arrangements can be used in the present invention. For example, resistance or voltage sensing can be used for temperature sensing as disclosed in U.S. Pat. No. 4,780,120 which is hereby incorporated by reference.

The bushing 102 is segmented into three sections: a first or left end segment 104, a second or center segment 106 and a third or right end segment 108. It is noted that the present invention is described with reference to the three segment bushing 102 for purposes of example and illustration only. It is to be understood that the present invention can be used with bushings having not only three segments, as illustrated, but also with bushings having fewer than three segments or more than three segments as are appropriate for given applications.

Alternating current (ac) electrical energy is connected across the entire bushing 102 by a pair of conductors 110, 112 which are connected between the bushing 102 and a secondary winding 114 of a first power transformer 116. Electrical energy from a power source $V_{ac}$ provided on the conductors 120 is connected to a primary winding 118 of the first power transformer 116 through a power controller 122. The power controller 122 is typically a solid state control device which is connected to the power source $V_{ac}$ and receives a control signal from a first process controller 124 via a conductor 126.

The first process controller 124 receives a temperature representative voltage signal from a first thermocouple 128 secured to the center segment 106 of the bushing 102 via a conductor 130. The first process controller 124 may be like or similar to the Models 6810 or 6403 controllers manufactured by Electronic Control Systems of Fairmont, W. Va. or the Leeds and Northrop Emax V controller. It is noted that although the first thermocouple 128 senses only the temperature of the center segment 106 of the multiple segment bushing 102, its output signal controls the application of electrical energy to the entire bushing 102. Accordingly, the power controller 122 may typically have a capacity of between approximately 10 and 35 kilowatts of electrical power and apply a maximum current of about 1,000 amps.

A second thermocouple 129 generates a voltage signal representative of the temperature of the first or left end segment 104 of the bushing 102 which is carried to a second process controller 131 via a conductor 133. The second process controller 131 can be the same type as the first process controller 124 previously described. The output signal from the second process controller 131 is carried to a first heating and cooling or supplemental controller 132 via a conductor 134. The output signal from the second process controller 131 serves as an input control signal for the first supplemental controller 132 which controls the current flow through and temperature of the first or left end segment 104 of the bushing 102 via a second power transformer 136.

A third thermocouple 138 generates a voltage signal representative of the temperature of the second or right end segment 108 of the bushing 102 which is carried to a third process controller 140 via a conductor 142. The third process controller 140 can be the same type as the first and second process controllers 124, 131 previously described. The output signal from the third process controller 140 is carried to a second heating and cooling or supplemental controller 144 via a conductor 146. The output signal from the third process controller 140 serves as an input control signal for the second supplemental controller 144 which controls the current flow through and temperature of the second or right end segment 108 of the bushing 102 via a third power transformer 148.

Figure 2:
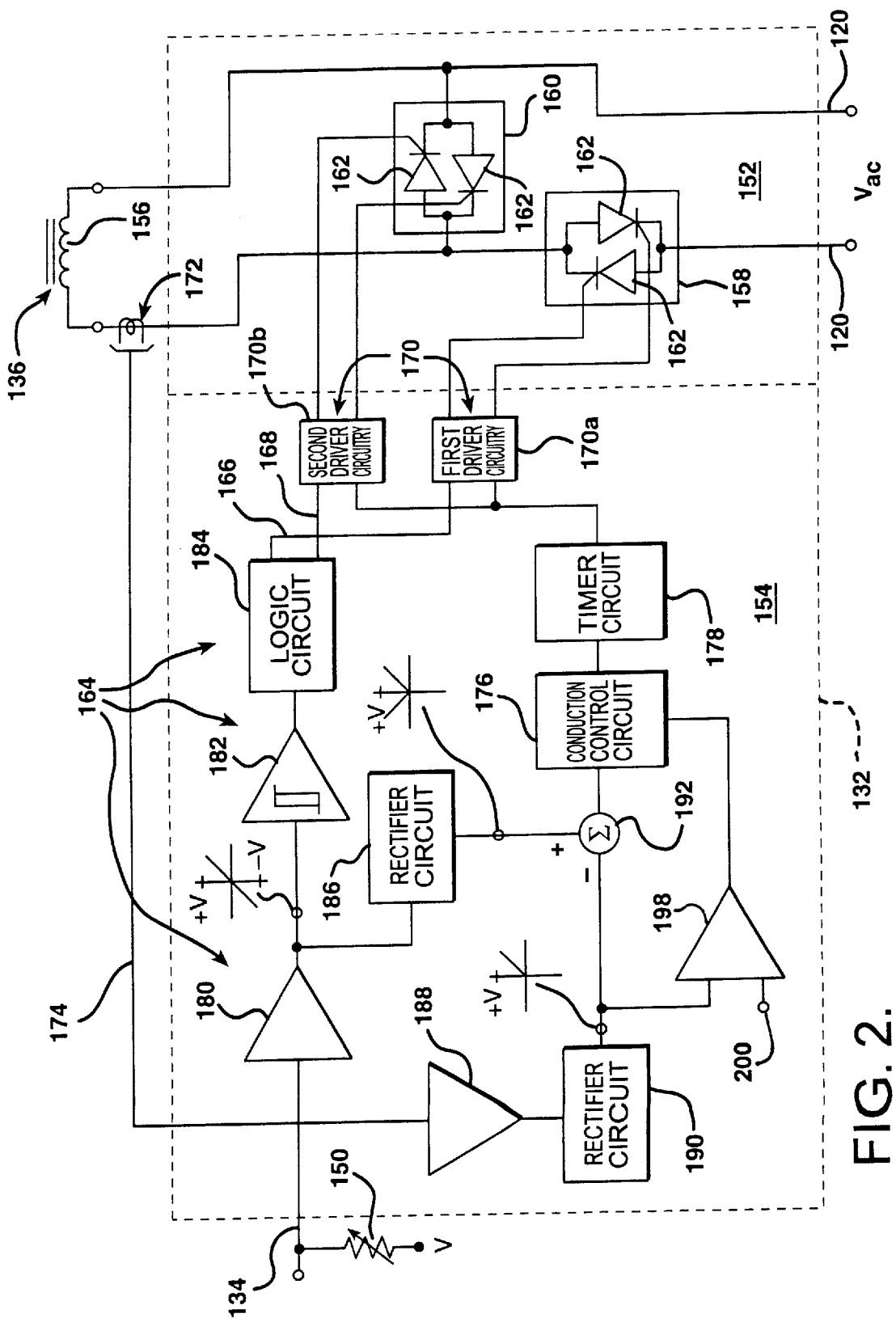
FIG. 2 is a schematic block diagram of a heating and cooling controller which can be used in the controller of FIG. 1.

Since the first supplemental controller 132 and the second supplemental controller 144 are identical to one another, only the first supplemental controller 132 will be described herein. With reference to FIG. 2, the supplemental controller 132 is responsive to an input control signal received on the conductor 134. As illustrated, the input control signal is the output signal generated by the second process controller 131 which output signal is representative of a desired temperature for the first or left end segment 104 of the bushing 102. An input control signal can also be provided to the supplemental controller by other means. For example, a control signal can be generated by a potentiometer 150 which can be manually adjusted by an operator of a machine including the bushing 102 with the potentiometer 150 being connected to a reference voltage V.

The supplemental controller 132 includes a heating and cooling circuit 152 coupled to the first or left end segment 104 of the bushing 102. A controller circuit 154 operates the heating and cooling circuit 152 to heat and cool the segment 104 in accordance with the input control signal received on the conductor 134. The heating and cooling circuit 152 drives the second power transformer 136 which has a primary winding 156 and a secondary winding 157 connected across the segment 104, see FIG. 1.

The primary winding 156 of the transformer 136 is selectively connected to the power source $V_{ac}$ connected to the conductors 120 via a first current switch 158. The first current switch 158 is connected in series between the power source $V_{ac}$ and the primary winding 156 for controllably passing current to the transformer 136 for heating the segment 104 of the bushing 102.

A second current switch 160 is connected in shunt across the primary winding 156 of the transformer 136 between the first current switch 158 and the primary winding 156. The second current switch 158 provides for controllably passing current therethrough to divert current from the segment 104 for cooling the segment 104. In the illustrated embodiment, the first and second current switches each comprise a pair of silicon controlled rectifiers 162 connected anti-parallel to one another. Of course, other current switches can be used in the present invention as will be apparent to those skilled in the art.

The controller circuit 154 includes heat-cool control means, comprising a heat-cool detector circuit 164 in the illustrated embodiment. The heat-cool detector circuit 164 is responsive to the control signal received on the conductor 134 for determining whether the control signal commands heating or cooling of the segment 104 of the bushing 102 and for generating heat-cool signals on conductors 166, 168, i.e. heating signals on the conductor 166 and cooling signals on the conductor 168.

Driver means comprising driver circuitry 170 is coupled between the heat-cool detector circuit 164 and the heating and cooling circuit 152. In the illustrated embodiment, the driver circuitry 170 comprises a first driver circuit 170a which is enabled by the heating signals on the conductor 166 for operating the first current switch 158 for heating the segment 104 of the bushing 102 and a second driver circuit 170b which is enabled by the cooling signals on the conductor 168 for operating the second current switch 160 for cooling the segment 104.

The supplemental controller 132 further comprises a current sensor or current transformer 172 for determining current flow in the primary winding 156 of the transformer 136. The current transformer 172 generates a current flow signal representative of current flow in the primary winding 156 which is carried on conductors 174 to the controller circuit 154.

The controller circuit 154 further comprises conduction setting means, a conduction control circuit 176 as illustrated, for combining the control signal with the current flow signal to generate a conduction control signal. A timer circuit 178 is coupled to the first and second driver circuits 170a, 170b and is driven by the conduction control circuit 176 for generating conduction control signals which determine conduction angles for the first and second current switches 158, 160. The conduction control circuit 176 preferably is a proportional-plus-integral (P-I) controller; however, it can also be a proportional-plus-integral-plus-derivative (PID) controller or other appropriate control circuit known in the art. The timer circuit 178 can be a 555 timer circuit, an LM 122H or a number of other commercially available timer circuits.

More particularly, the input control signal on the conductor 134 is received by a scaling amplifier 180 which scales the input control signal to form an internal control signal for the heat-cool detector circuit 164. In a working embodiment of the invention of the present application, the scaling amplifier 180 also is configured for off-setting the resulting control signal such that it defines scaling and shifting means for the heat-cool detector circuit 164. The resulting control signal then extends from approximately −7 volts to approximately +7 volts in a substantially linear manner, see FIG. 2.

The resulting control signal is passed to comparator means, comprising a comparator circuit 182 having hysteresis as illustrated, for comparing the control signal to a threshold signal. When the control signal is above the threshold signal, supplemental current is to be connected to the segment 104 for heating the segment, and when the control signal is below the threshold signal, current is to be diverted around the segment 104 for cooling the segment 104.

The output of the comparator circuit 182 is passed to a logic circuit 184 for generating heating signals on the conductor 166 and for generating cooling signals on the conductor 168. By both scaling and shifting the input control signal to generate the control signal, the threshold is approximately 0 volts. Hysteresis in the comparator circuit 182 prevents the heating and cooling signals from jumping back and forth for command signals near the threshold. Further, the logic circuit 184 includes internal delays to ensure that the first and second current switches 158, 160 are never turned on at the same time.

The control signal from the scaling amplifier 180 is passed through a first rectifier means to take its absolute value. This results in a signal taking the shape of a "V" going from +7 volts to 0 volts for maximum cooling to no cooling or heating and from 0 volts to +7 volts for no heating or cooling to maximum heating, see FIG. 2. The rectifier means comprises a rectifier circuit 186 as illustrated.

The current flow signals on the conductors 174 are also passed through a scaling amplifier 188 and passed to a second rectifier means, comprising a rectifier circuit 190 as illustrated, to result in a positive going signal ranging from 0 volts to +7 volts, see FIG. 2. The positive going signal is representative of current flow in the primary winding 156 whether supplemental current is being provided to the segment 104 of the bushing 102 or whether current is being diverted from the segment 104 of the bushing 102. In a working embodiment of the supplemental controller 132, the rectifier circuits 186, 190 were constructed as precision rectifiers using operational amplifiers; however, other rectifier circuits such as simple diode rectifier circuits can be used in the invention.

The conduction setting means then also comprises a summer 192 which combines the rectified control signal and the rectified current flow signal to generate the conduction setting signal in cooperation with the conduction control circuit 176. That is, the summer 192 combines the rectified control signal and the rectified current flow signal to generate a control error signal which is processed by the conduction control circuit 176 to generate the conduction setting signal which is in turn processed by the timer circuit 178 to generate conduction angle signals for the first and second current switches 158, 160.

In summary, an input control signal representative of a desired bushing segment temperature is generated by a process controller or other control device, such as the potentiometer 150. The input control signal is processed and evaluated to determine whether it is calling for heating or cooling of the segment 104 of the bushing 102. The processed input control signal is also compared to a current level in the primary of the transformer 136 to determine the amount of current which is being injected into or diverted around the segment 104 of the bushing 102. The resulting error signal is processed by the conduction control circuit 176 to generate the conduction setting signal which is in turn processed by the timer circuit 178 to generate conduction control signals for the first and second current switches 158, 160. That is, the current switches 158, 160 are activated in response to the conduction control signals to pass from 0° to 180° of each half cycle of injection current or diversion current to thereby inject from 0 to approximately 200 amps of auxiliary current to the segment 104 or to divert from 0 to approximately 200 amps of current from the segment 104.

Figure 3:
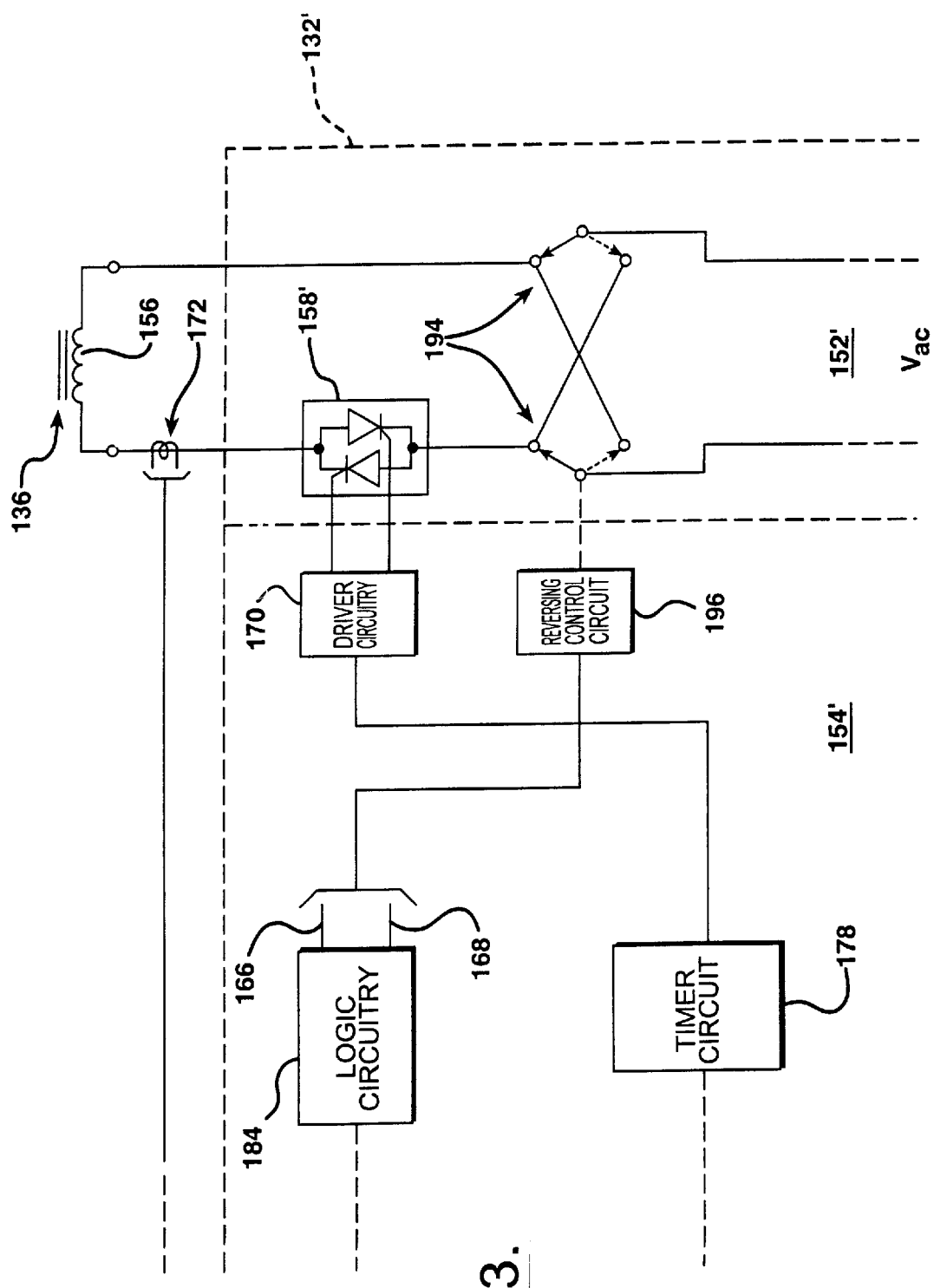
FIG. 3 is a partial schematic block diagram of a modified embodiment of the heating and cooling controller of FIG. 2 which applies in-phase current for heating and out-of-phase current for cooling.

An alternate embodiment of a supplemental controller 132' is illustrated in a partial schematic block diagram form in FIG. 3. Components of the supplemental controller 132' which are the same as the supplemental controller 132 of FIG. 2 are labeled with the same identification numerals. Further, since the portion of the supplemental controller 132' to the left of the logic circuit 184 and the timer circuit 178 are the same as in FIG. 2, this portion of the supplemental controller 132' is not shown in FIG. 3.

As shown in FIG. 3, the heating and cooling circuit 152' drives the second power transformer 136. The primary winding 156 of the transformer 136 is selectively connected to the power source $V_{ac}$ connected to the conductors 120 via a current switch 158' and a reversing switch 194 which is controlled by a reversing control circuit 196. The reversing control circuit 196 controls the reversing switch 194 in response to the heating and cooling signals on the conductors 166, 168 such that the reversing switch 194 directly connects the power source $V_{ac}$ to the primary 156 when heating is called for and crosses the connection of the power source $V_{ac}$ to the primary winding 156 when cooling is requested. In this way, in-phase current is injected into the segment 104 when heating is called for and out-of-phase current is injected to subtract current from the segment 104 when the segment 104 is to be cooled.

The current switch 158' is connected in series between the power source $V_{ac}$ and the primary winding 156 for controllably passing current to the transformer 136 for heating the segment 104 of the bushing 102. Since control of heating and cooling is performed by the reversing control circuit 196 and the reversing switch 194, the current switch 158' is controlled only by the conduction control signals generated by the timer 178 in this embodiment.

Since operation of the controllers illustrated in FIGS. 2 and 3 in the system of FIG. 1 in accordance with the present invention is readily apparent in view of the above description, it will not be further described herein.

Having thus described the invention of the present application in detail and by reference to preferred embodiments thereof, it will be apparent that modifications and variations are possible without departing from the scope of the invention defined in the appended claims.

What is claimed is:

1. A supplemental controller for a segment of a fiber glass bushing controlled by a primary bushing controller, said supplemental controller comprising:

a transformer having a secondary winding connected to said segment and a primary winding connectable to an ac power source used by said primary bushing controller;

a first current switch connected in series with said primary winding for connecting said primary winding of said transformer to said ac power source;

a second current switch connected in shunt across said primary winding;

heat-cool control means for receiving a control signal representative of a commanded temperature for said segment and generating heat enable signals and cool enable signals;

current monitoring means for monitoring current flow in said primary winding of said transformer and generating a current flow signal;

conduction setting means responsive to said control signal and said current flow signal for generating a conduction setting signal;

timer means for generating conduction control signals in response to said conduction setting signal; and driver means responsive to said conduction control signals and said heat enable signals for operating said first current switch to heat said segment, and responsive to said conduction control signals and said cool enable signals for operating said second current switch to cool said segment.

2. A supplemental controller for a segment of a fiber glass bushing as claimed in claim 1 wherein said heat-cool control means comprises:

scaling and shifting means for receiving an input control signal and scaling and shifting said input control signal to generate said control signal;

comparator means for comparing said control signal to a threshold signal above which supplemental current is to be connected to said segment for heating said segment and below which current is to be diverted around said segment for cooling said segment; and logic circuit means connected to said comparator means for generating said heat enable signals and said cool enable signals.

3. A supplemental controller for a segment of a fiber glass bushing as claimed in claim 2 wherein said conduction setting means further comprises first rectifier means for rectifying said control signal to generate a rectified control signal, second rectifier means for rectifying said current flow signal to generate a rectified current flow signal, said conduction setting means combining said rectified control signal and said rectified current flow signal to generate said conduction setting signal.

4. A supplemental controller for a segment of a fiber glass bushing as claimed in claim 3 wherein said conduction control means comprises a proportional plus integral controller.

* * * * *

UNITED STATES PATENT AND TRADEMARK OFFICE
CERTIFICATE OF CORRECTION

PATENT NO. : 6,177,656 B1
DATED : January 23, 2001
INVENTOR(S) : Varrasso et al.

It is certified that error appears in the above-identified patent and that said Letters Patent is hereby corrected as shown below:

<u>Title page,</u>
[62] Related U.S. Application Data, "Division of application No. 09/009,478, filed on Jan. 20, 1998, now abandoned," should read -- Division of application No. 09/009,478, filed on Jan. 20, 1998, now U.S. Patent No. 6,167,728, --.

Signed and Sealed this

Twenty-first Day of August, 2001

*Attest:*

*Attesting Officer*

NICHOLAS P. GODICI
*Acting Director of the United States Patent and Trademark Office*